United States Patent [19]

Perez Borruate

[11] Patent Number: 4,775,853

[45] Date of Patent: Oct. 4, 1988

[54] DEVICE AND INSTALLATION FOR THE INSTANTANEOUS DETECTION OF ONE OR MORE PHYSICAL PHENOMENA HAVING A CHARACTER OF RISK

[75] Inventor: Héctor Perez Borruat, Clichy, France

[73] Assignee: Compagnie Francaise de Protection Electrique Proteg (C.F.P.E. Proteg), Saint-Quen, France

[21] Appl. No.: 813,964

[22] Filed: Dec. 27, 1985

[30] Foreign Application Priority Data

Dec. 27, 1984 [FR] France ............................... 84 19872

[51] Int. Cl.[4] ........................ G08B 19/00; H04N 7/18

[52] U.S. Cl. .................................... 340/521; 340/565; 358/108; 358/113; 358/105; 250/226; 250/339; 250/482.1; 250/504 R

[58] Field of Search ............... 340/521, 506, 522, 541, 340/565, 567, 691; 358/105, 108, 160, 109, 113, 110; 356/432, 434, 435; 250/336.1, 338, 339, 341, 349, 356.1, 363 R, 363 S, 472.1, 482.1, 504

[56] References Cited

U.S. PATENT DOCUMENTS

| | | | |
|---|---|---|---|
| 3,612,764 | 10/1971 | Gilkeson et al. | 358/108 |
| 3,686,434 | 8/1972 | Lemelson . | |
| 3,740,466 | 6/1973 | Marshall et al. | 358/105 |
| 4,112,463 | 9/1978 | Kamin | 358/108 |
| 4,257,063 | 3/1981 | Loughry et al. | 358/108 |
| 4,337,481 | 6/1982 | Mick et al. | 358/108 |
| 4,437,111 | 3/1984 | Inai . | |
| 4,458,266 | 7/1984 | Mahoney | 358/108 |

OTHER PUBLICATIONS

Funkschau, No. 11, Mai 1982, pp. 53-56, Munich, DE; G. Wilhelm et al.: "Videochnik in Sicherheitsanlagen", pp. 53, 54.

*Primary Examiner*—Donnie L. Crosland

*Attorney, Agent, or Firm*—Oblon, Fisher, Spivak, McClelland & Maier

[57] ABSTRACT

A device and installation are provided for the instantaneous and simultaneous detection, inside and outside, of radiations emitted in the infrared, visible and ultraviolet spectra by simultaneous physical phenomena having a character of risk, such as intrusion, fire, explosion, leaks of dangerous fluids and electric leaks, disturbances and absence of movement of a regular periodic phemonenon, said radiations being emitted, directly by the phenmonena to be monitored at the time when the risk appears or being caused artifically by directing over an appropriate field of view, in which take place said phemonena, a source of radiation comprised in the infrared, visible and ultraviolet, and adapted to the nature of the phemonena involved, said field of view covered by the detection device having appropriate horizontal and vertical dimensions comprising at least one spectral correction filter known pass band chosen as a function of the nature of the radiation, a linear or circular polarization filter, a microprism array, and an image booster. An installation utilizing at least one detection device is disclosed, where the detection device cooperates with at least one video data processing unit, at least one video monitor, each associated to a detection device, a time delay unit, a cyclic switch, a video tape recorder and a television telephone transmitter.

11 Claims, 8 Drawing Sheets

DEVICE AND INSTALLATION FOR THE INSTANTANEOUS DETECTION OF ONE OR MORE PHYSICAL PHENOMENA HAVING A CHARACTER OF RISK

BACKGROUND OF THE INVENTION

1. Field of the Invention

The present invention relates to a device and an installation for the instantaneous and multipurpose detection, inside and/or outside, of physical phenomena having a character of risk and being as varied as intrusion and/or fire and/or explosion and/or leaks (of fluids and/or "electric" ones) and/or else the disturbance or absence of a movement or of a regular or periodic phenomenon, taken separately or together and possibly simultaneously.

2. Description of the Prior Art

In the particular case of fire detection, different types of detectors are used at the present time which are able to measure the presence of one or other of the following physical phenomena:

combustion aerosols, combustion gases, visible smoke, flames, temperature threshold, rapid temperature rise.

From the point of view of the physical phenomenon detected, fire detectors are distinguished as indicated below:

ionic detectors, which allow combustion aerosols to be detected and which are responsive to the variations of the properties of an artificially ionized atmosphere;

optical smoke detectors, responsive to the presence of visible smoke, which are of the so called:

opacity type (responsive to the attenuation of light due to the presence of smoke), and diffusion type (using the diffusion effect of the light due to the smoke);

optical flame detectors, which use the energy radiated by the flames (for reasons of stability and selectivity, the visible radiation of the flame is not used but rather the infrared or ultraviolet radiation);

heat detectors, whose sensitive element measures:

a preset temperature threshold (temperature threshold detector), or the rate at which the temperature rises (thermovelocimetric detectors).

In addition, so called special detectors are known, more particularly:

ember detectors, which are specifically used for detecting the unmodulated infrared radiation characteristic of ember fires;

acoustic detectors, which measure the bursting noise of a bulbcontaining a gas which, under the effect of the pressure increase due to the heat, causes the bulb to "burst";

laser detectors, which provide a linear check of the variation present, on reception, in a coherent photon beam emitted by an appropriate source and caused by the convection movement due to the seats of the fire, and surface effect detectors, which in their basic principle are used as dangerous gas detectors.

In so far as fire detection is concerned using said means, they have a certain number of drawbacks, more particularly:

in so far as ionic detectors are concerned, they are slow and are never used outside because they are influenced by air currents; furthermore, they may cause untimely alarms (i.e. without real danger) too frequently;

in so far as optical smoke detectors are concerned:

the operation of opacity type detectors is greatly disturbed in dusty atmospheres and they react with a certain delay for smoke emissions of low opacity, whereas diffusion type detectors have difficulty in detecting black smoke because of their poor reflecting power;

furthermore, diffusion type detectors are too slow and are never used outside;

in so far as flame detectors are concerned (infrared or ultraviolet detectors), although they may be used outside and although they are rapid, the corresponding detection area (or surveyed area) is very much reduced; in addition, they are sensitive to atmospheric phenomena (more especially to the illumination due to lightning and the sun) and the object being monitored must be fixed: in addition, outside protection requires a certain number of requirements to be complied with which make it complicated and expensive;

in so far as heat detectors are concerned, they are slow and are never used outside;

in so far as the so called special detectors are concerned, ember detectors, which may be used possibly outside as well, are at present still in the experimental application stage, acoustic detectors, when they are used outside, are disturbed by the surrounding noise, laser detectors provide detection along an axis and not of a volume, so that their outside use, more particularly, requires a large number of this type of device to be used (which are at present economically valid essentially for protecting large inside areas, for example supermarkets, and surface effect detectors, which have solved the problem of the monitoring range, have a sensitive element subject to chemical drifting and, furthermore, they are expensive.

In short, and generally, still limited to the particular case of fire detection, the traditional systems rely on the analysis of physical phenomena (more particularly optical, thermal, mechanical phenomena) and chemical phenomena using detectors which are very specialized in their functions and whose design compels use thereof almost exclusively inside, in that no detector lends itself to outside use without enormous constraints which greatly limit the real use of some of them to rare specific cases and which completely prohibit the other applications.

Furthermore, to the knowledge of the applicant, there exists at present no single system which is capable of detecting outside as well as inside, not only the different manifestations of a fire, but at the same time other physical phenomena as well having a character of risk , such as intrusion, and/or leaks (of fluids and "electric" ones) and/or explosion, for example, as well as a priori any character of disturbance or absence in the regular movement of a system which may have dangerous or, in any case, undesirable consequences for the correct operation of the system.

SUMMARY OF THE INVENTION

The purpose of the present invention is therefore to provide a system for the instantaneous detection, inside and/or outside, of physical phenomena having a character of risk and being as varied as intrusion and/or fire and/or explosion and/or leaks (of fluids and/or "electric" ones) and/or else the disturbance and/or absence of a regular or periodic movement, taken individually or jointly and possible simultaneously.

Within the scope of this invention by intrusion is to be understood not only the presence of persons in a static field, but also the presence of any foreign body in the field of action of a priori any dynamic system, such as an automated industrial production line or similar.

The present invention provides then a device for the instantaneous and multipurpose detection, inside and/or outside, of physical phenomena having a character of risk and being as varied as intrusion and/or fire and/or explosion and/or leaks (of fluids and/or "electric" ones) and/or else the disturbance and/or absence of a movement or of a regular or periodic phenomenon, taken separately or jointly and possibly simultaneously, which detection device is characterized in that it is formed by a television camera with wide spectrum, namely extending simultaneously to the near infrared, to the visible and the ultraviolet spectra, or of reduced spectral sensitivity, namely limited to the infrared spectrum and/or visible or ultraviolet and/or visible spectra, which camera is equipped with:

at least one spectral correction filter with known pass band chosen as a function of the nature of the radiation, infrared and/or visible and/or ultraviolet, which is emitted directly by the phenomenon or phenomena to be monitored at the time when the risk appears or which is caused artificially by directing over the field to be monitored a source of radiation, infrared and/or visible and/or ultraviolet , appropriate to the nature of the phenomenon concerned, and, possibly, as well with:

a linear or circular polarization filter, and/or a microprism array, cut so as to have the number of microprisms appropriate to the field or to the desired angle of coverage, and/or an image booster, of the first or of the second order or of a higher order, which is coupled to the lens of the camera, the focal length of this latter being chosen as a function of the distance existing between the position of the camera and the zone to be monitored as well as the function of the horizontal and vertical dimension of the area covered, at a given distance, by the detection; the values of the load resistors and of the negative feedback networks of the conventional type video preamplifier of the camera being modified so as to have a preamplifier whose response curve extends over a frequency range appropriate to each desired application, which amplifier receives the signal from a scanning tube, it too conventional, following the lens of the camera possibly equipped with said image booster.

The present invention also provides an installation for the instantaneous and multipurpose detection in said sense, which comprises in combination:

one or more detection devices conforming to the preceding arrangements, disposed appropriately in one or more inside and/or outside zones to be protected, one or more video information processing units, known per se, comprising more particularly an analog/-digital converter possibly associated with a microcomputer equipped with its video-graphic interface, the different detection devices being spaced apart between one or more of said processing units, which give an alarm signal, one or more video monitors, each associated with a detection device, and possibly, the units for using the video signal thus processed which are indicated hereafter:

a time delay unit, known per se, which receives the alarms given by the video information processing units so as to trigger an automatic telephone transmitter, it too known per se, and/or a cyclic switch and a video tape recorder with time stamp, known per se, associated with each video information processing unit, and/or a television telephone transmitter, known per se, broadcasting the video information processed to a distant monitoring station and capable of calling an alarm reception station, it too known per se, through the normal telephone network.

BRIEF DESCRIPTION OF THE DRAWINGS

Besides the above mentioned arrangements, the invention comprises further arrangements which will be clear from the following description.

The invention will be better understood from the complement of description which follows which refers to the accompanying drawings, in which.

It should however be understood that these drawings and the corresponding descriptive parts are given solely by way of illustration of the subject of the invention, of which they are in no way a limitation.

DESCRIPTION OF THE PREFERRED EMBODIMENTS

Within the scope of the present invention, the video technique is used for the simultaneous and instantaneous detection, inside and/or outside, of various physical phenomena having a risk character, such as:

intrusion, and/or fire, and/or explosion, and/or leaks (of fluids and/or "electric" ones).

It should be emphasized in this connection that, although it is true that limitatively to the specific field of the detection of intrusion at the present time the video technique is also used (particulally in a closed circuit), with television cameras and video monitors spaced apart appropriately, however, to the knowledge of the applicant, cameras have never been used either for fire detection or for the detection of the other phenomena having a character of risk which have been mentioned above.

In so far as the acquisition of information is concerned by using television cameras, the use of professional high definition and high sensitivity cameras is indispensable.

Depending on the nature of the risk or of the risks to be detected, cameras are used with reduced spectral response namely "infrared" or "ultraviolet" cameras, or else wide spectrum cameras.

In so far as intrusion detection is concerned, this may be provided obviously just as well with reduced spectrum as with wide spectrum cameras, the choice being made depending on the environmental characteristics and on the other risks contemplated.

Now, the photosensitive surface of a camera has a specific spectral response curve which, however, in no case is naturally adapted to a given environment and to a given risk or a given combination of risks. It is therefore necessary to modify the spectral response of the type of camera chosen by adding one or more filters with known passband (for example the filters 1*a* and 1*b* of FIG. 1) so as to obtain the overall spectral response of the camera always adapted to the environmental characteristics and to the risks contemplated; more precisely, the passband of the spectral correction filter or filters is chosen depending on the nature (infrared or ultraviolet of the radiation which will be emitted at the time when the monitored risk will appear.

Figure 1:
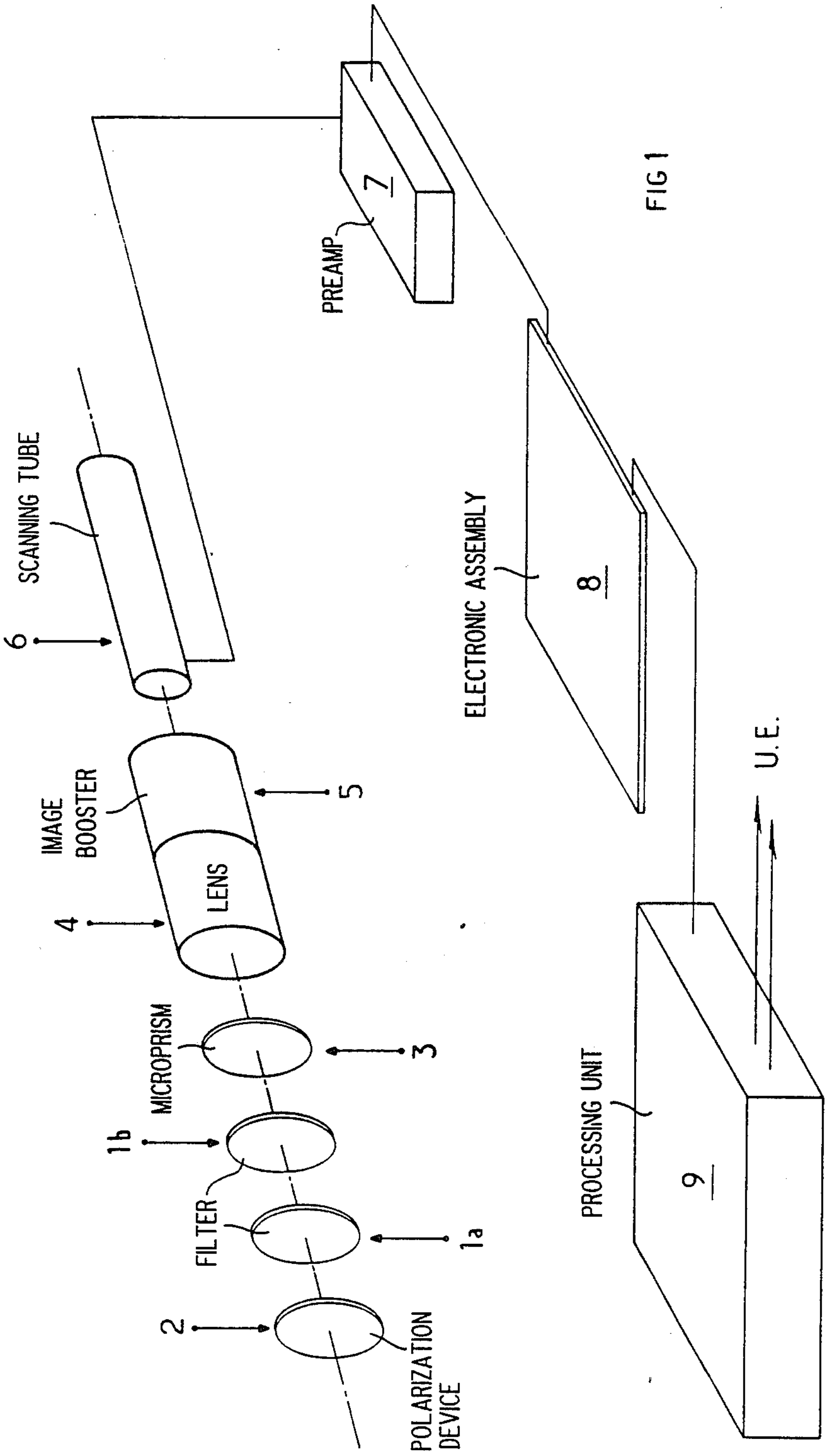
FIG. 1 illustrates the general diagram comprising the essential components of the detection system of the invention.

Furthermore, in some cases, the performances of the detection system of the invention may be substantially improved by adding an optical linear or circular polarization device 2, so as to attenuate or eliminate certain reflections and generally to increase the contrast and, consequently, the sensitivity of the detection system (cf. FIG. 1).

Moreover, considering the well known phenomenon of attenuation of the sensitivity as a function of the distance between the phenomenon to be detected and the detection device, another optical device should be provided formed by an array of microprisms 3 in an appropriate number, in order to artificially increase the volume of a seat of a fire more particularly: thus, any light point is diffracted (the microprisms in fact act like an optical amplifier, by diffraction), which eliminates the disadvantage of degressive sensitivity (cf. again FIG. 1).

The video signal (which is obtained from television cameras whose lens 4, made from a good quality optical glass or from quartz, may be coupled to an image booster 5, namely to a light amplifier and more particularly of the first or of the second order, and whose spectral response and sensitivity have been modified as mentioned above, and which is analyzed in a tube 6 (in particular a scanning tube "Newvicon ER") driving a video preamplifier 7 (cf. FIG. 1).

Figure 2:
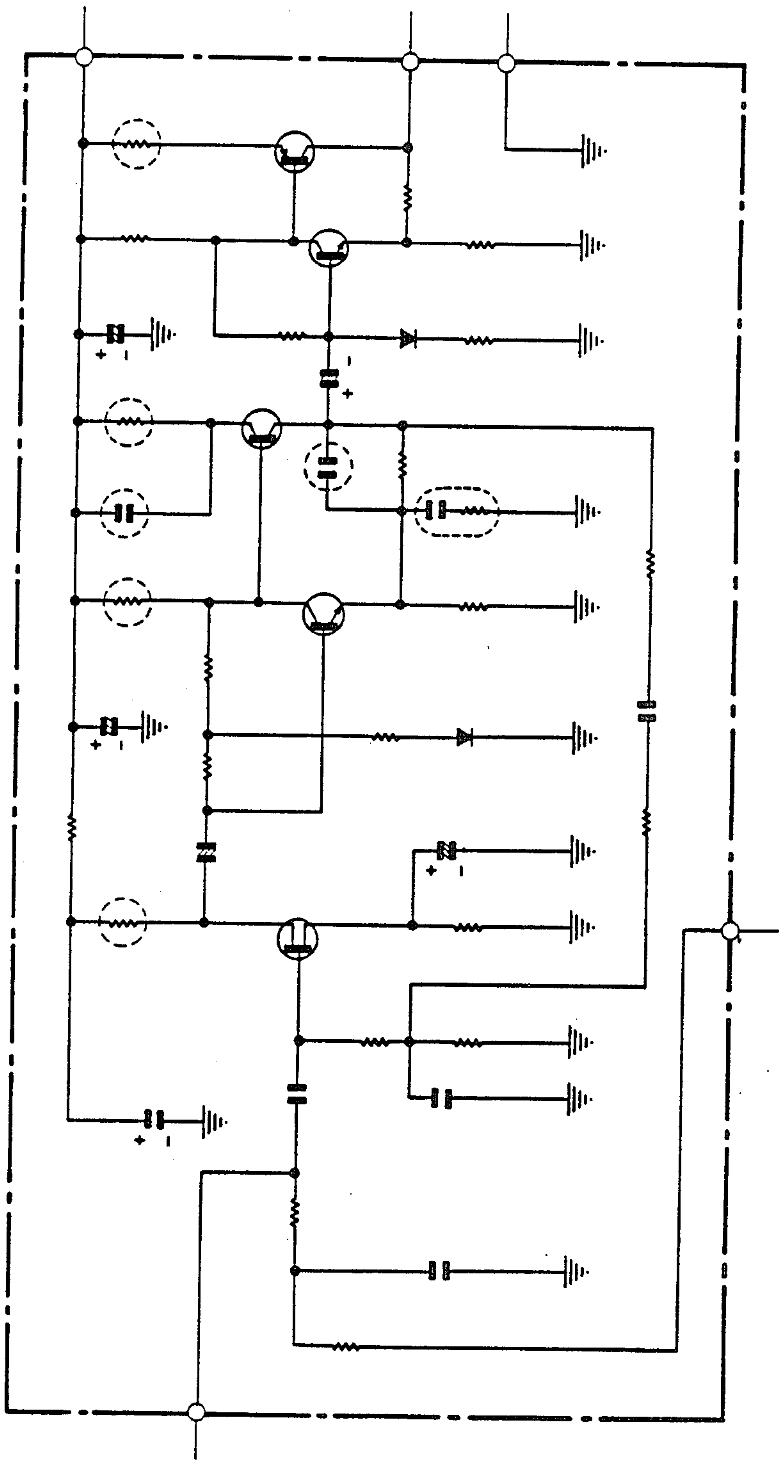
FIG. 2 illustrates a conventional electronic diagram of the video preamplification block shown in FIG. 1 with the indication of the resistance and capacity parameters which are likely to be changed as a function of the desired response.

Now, the standard values of the load resistors, as well as of the negative feedback networks of this preamplifier, must be changed so that the response curve of the video preamplifier is appropriate to each of the applications envisaged; these are modifications which are within the scope of a man skilled in the art: for this reason, in FIG. 2 the elements of the standard circuit of a type (moreover not limitative) of conventional video amplifier have been surrounded with broken lines, whose values are likely to be modified in said direction.

After having been preamplified, the video signal is processed in a standard type electronic assembly 8 forming an integral part of the traditional equipment of a video 9 camera (cf. FIG. 1).

In so far as the video signal thus obtained is concerned, it is fed to a video information processing unit (cf FIG. 1), namely to:

an analog/digital converter converting a certain number of bits, in particular $2^6=64$ or $2^8=256$. In this case, a subsystem generates the horizontal and vertical addresses (1024 or 4096, respectively, depending on said number of bits). The digital information which is stored bit by bit is compared with a program loaded in an EPROM store and, if the video voltage varies at one or more addresses, a comparator gives a usable alarm signal, and possibly also to:

a microcomputer equipped with its corresponding video-graphic interface: in this case, the system obviously has great software flexibility and an appreciably greater memory capacity.

Whereas, with the analog/digital converter, the variation in space of the phenomenon or phenomena to be monitored can be positioned, the use of a microcomputer allows the recognition of form to be obtained (image analysis) because of the increase of the fineness of analysis (matrix of more than 100.000 picture elements or "pixels").

Since the design of the detection system of the invention is semi-automatic, that involves the interpretation or use by human beings of the information supplied by the system, namely video images and signals localizing anomalies, available more particularly on monitors and/or video tape recorders.

Furthermore, since the applications are almost always related to safety measures, optimum efficiency is obtained - after human interpretation - by an intervention which may be localized or remote (transmission of the information by radio or telephone line).

In what follows different examples are given by way of non limitative applications illustrating the principles which are at the basis of the present invention. In each example the following are used:

a lens formed by a good quality optical glass (with good reproduction) up to the near infrared (more particularly the apochromatic system, "ED" or similar) long telephoto lens, whose focal length is chosen as a function of the desired horizontal and vertical coverage for a given distance between the camera and the possible risk to be detected, and a scanning tube, formed for example by the "Newvicon ER" type, the standard values of the load resistors and of the negative feedback networks of the video preamplifier of the camera being modified so as to obtain a response curve in a frequency range appropriate to each application.

In each example, the initial response curve of the camera, modified for the desired purpose, is represented by curve a.

In the different examples which follow the lens may cooperate with:

an image booster, which may be of the first or second order or of a higher order, and/or a microprism array, cut so as to have the number of microprisms appropriate to the contemplated application (the number of microprisms decreases with the angle of coverage), and/or a polarizing filter, which may be linear or circular, and/or at least one filter for the spectral correction of the initial response curve of the camera (it is a question for example of restricted Wratten filters).

EXAMPLE NO. 1—REDUCED ANGLE VOLUMETRIC PROTECTION

Figure 3A:
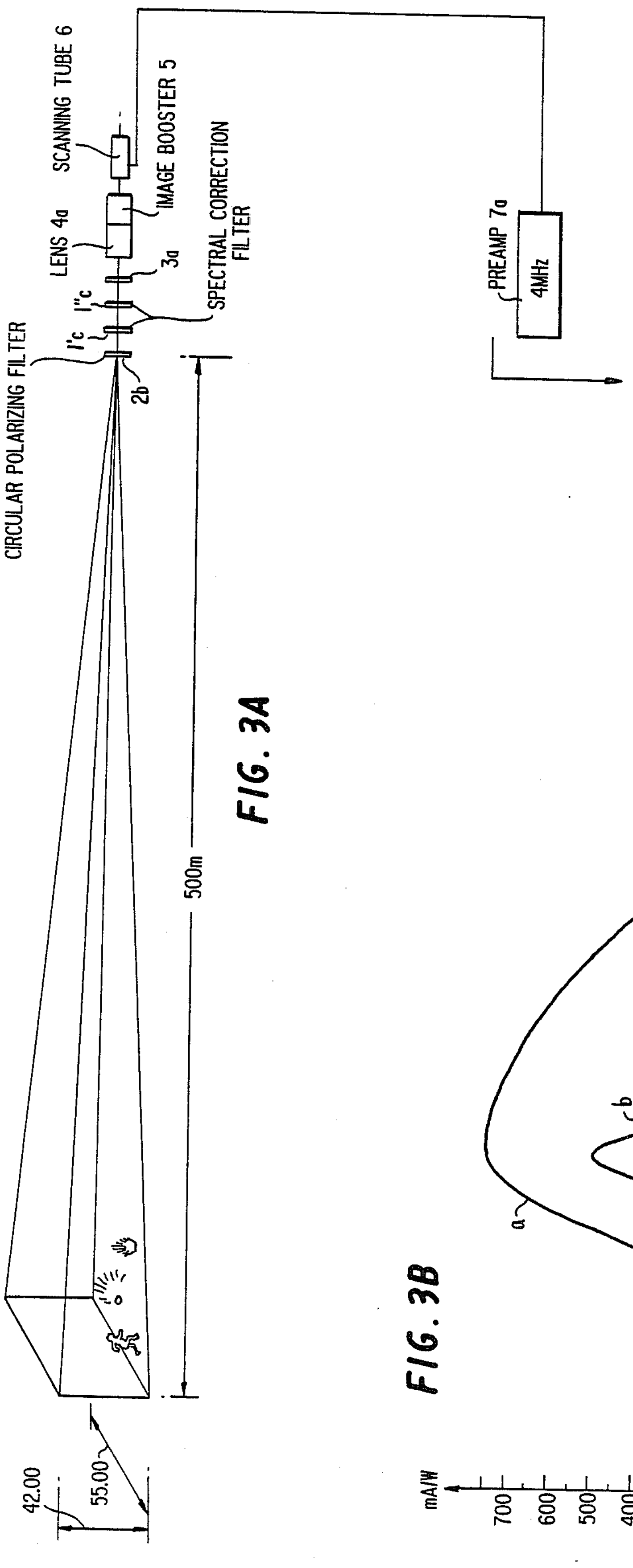
FIGS. 3A–3C to 8A–C show schematically different examples given by way of nonlimitative applications of the invention.
Figure 3C:
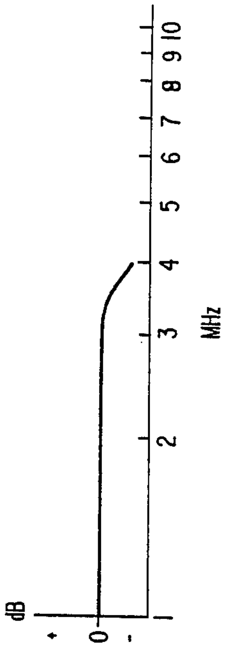
Figure 3B:
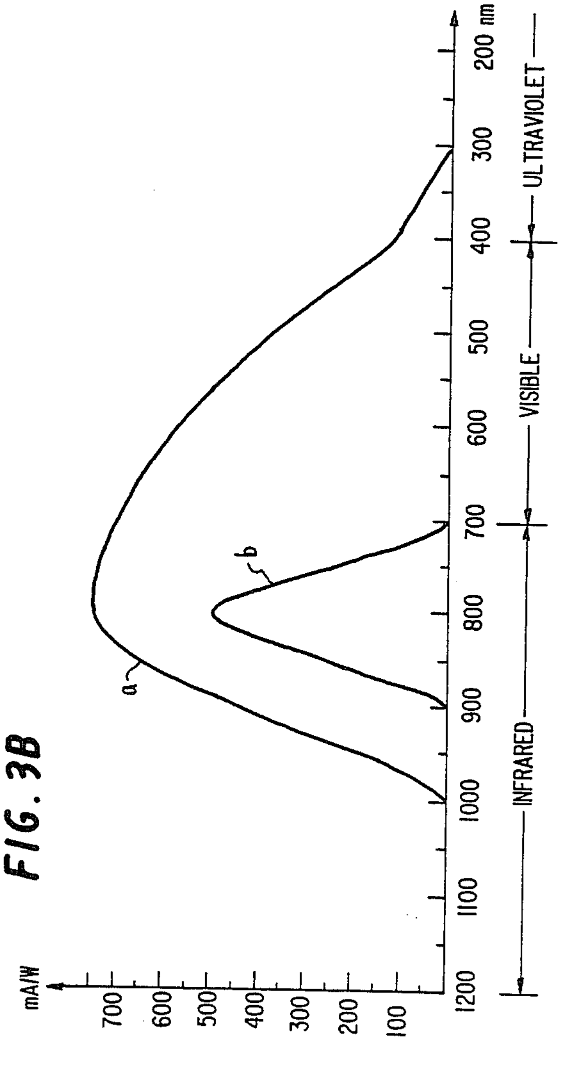

The general diagram is illustrated in FIG. 3A–3C and refers to the coverage of a probable intrusion and/or fire and/or explosion risk situated at a distance of 500 m from the camera (and even more, the maximum coverage distance depending essentially on the real performances of the different basic components of a camera, namely the lens, the scanning tube, the video preamplifier as well as accessory components which may possibly cooperate, in accordance with the invention, with this basic equipment, namely the image booster and filters)

In this case, the following may be used:

a circular polarizing filter 2*b*, two spectral correction filters 1'*c* and 1''*c* for obtaining the corrected spectral response curve b which is limited in the values of linear infrared spectrum (the response is limited to 50% between 750 and 850 nm, whereas the response is absolute between 700 and 900 nm ), a microprism array 3*a* cut so as to have 100.000 microprisms, a lens 4*a* whose focal length is situated between 100 and 250 mm, which provides, in correspondance with the ends of this range of focal length values and at a distance of 500 m:

a horizontal coverage of 55 m and vertical coverage of 42 m for 100 mm of focal length, and a horizontal coverage of 22 m and a vertical coverage of 16 m for 250 mm of focal length, an image booster 5 of the first order, the video preamplifier 7*a* being adjusted so as to have a response curve up to 4 MHz.

EXAMPLE NO. 2—SEMI-REDUCED ANGLE VOLUMETRIC PROTECTION

Figures 4A, 4B, 4C:
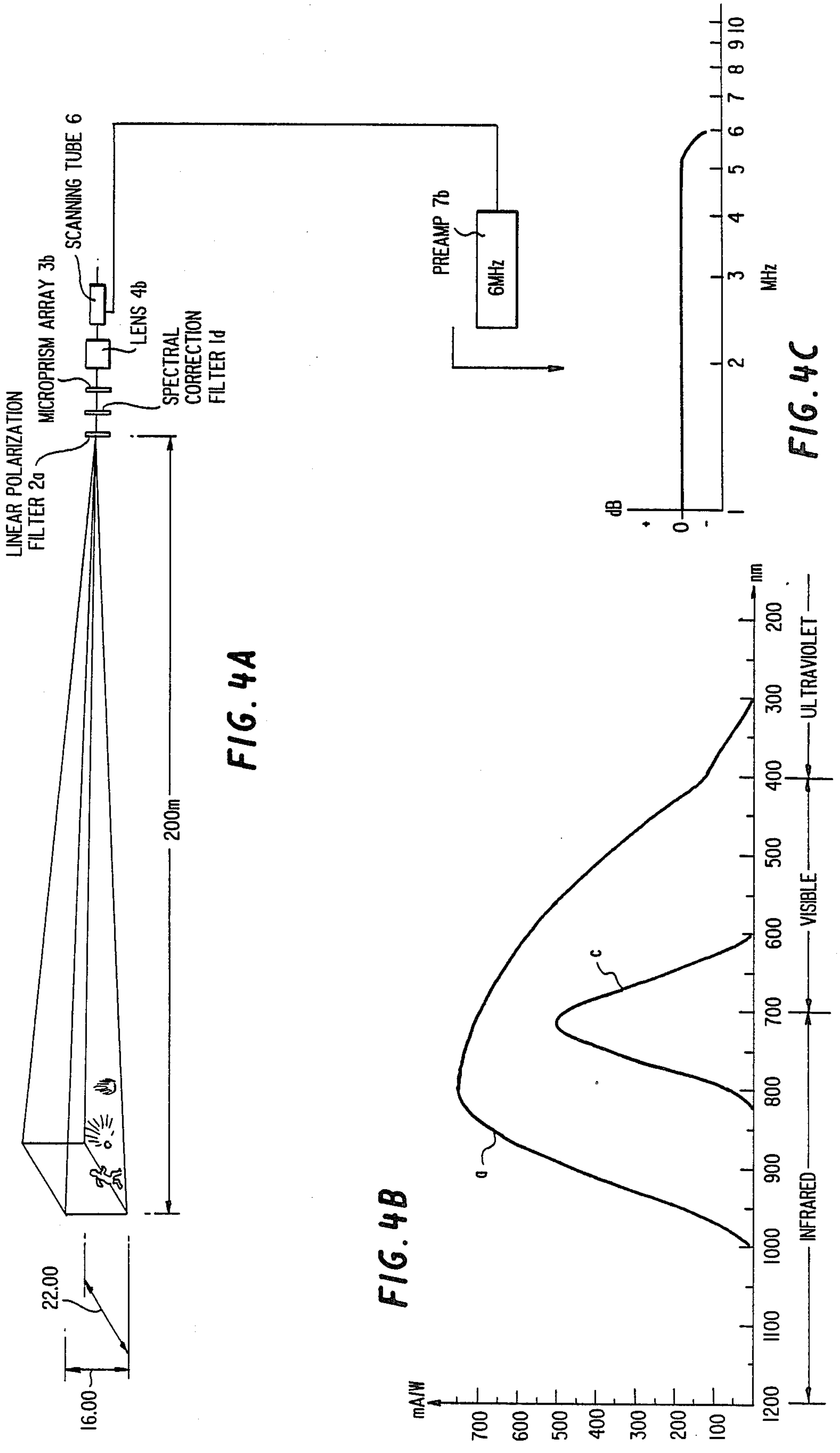

The general diagram is illustrated in FIG. 4A–4C and refers to the coverage of a possible intrusion and/or fire and/or explosion risk situated at a maximum distance from the camera of about 200 m.

In this case, the following are used:

a linear polarizing filter 2*a*, a spectral correction filter 1*d* for obtaining the corrected spectral response curve c which is limited to be astride the infrared and visible spectra, namely between the values of the near infrared spectrum and orange of the visible spectrum (the response is limited to 50% between 650 and 770 nm, whereas the response is absolute between 600 and 820 nm), an array of microprism 3*b* cut so as to have 250.000 microprisms, a lens 4*b* whose focal length is between 75 and 100 mm (average telephoto lens), which provides in correspondance with the ends of this range of focal length values and at the distance of 200 m:

a horizontal coverage of 30 m and a vertical coverage of 22 m, for 75 mm of focal length, and horizontal coverage of 22 m and vertical coverage of 16 m, for 100 mm of focal length, the video preamplifier 7*b* being adjusted so as to have a response curve up to 6 MHz.

The absence of image booster will be noted in this example and in the following examples.

EXAMPLE NO. 3—WIDE ANGLE VOLUMETRIC PROTECTION

Figures 5A, 5B, 5C:
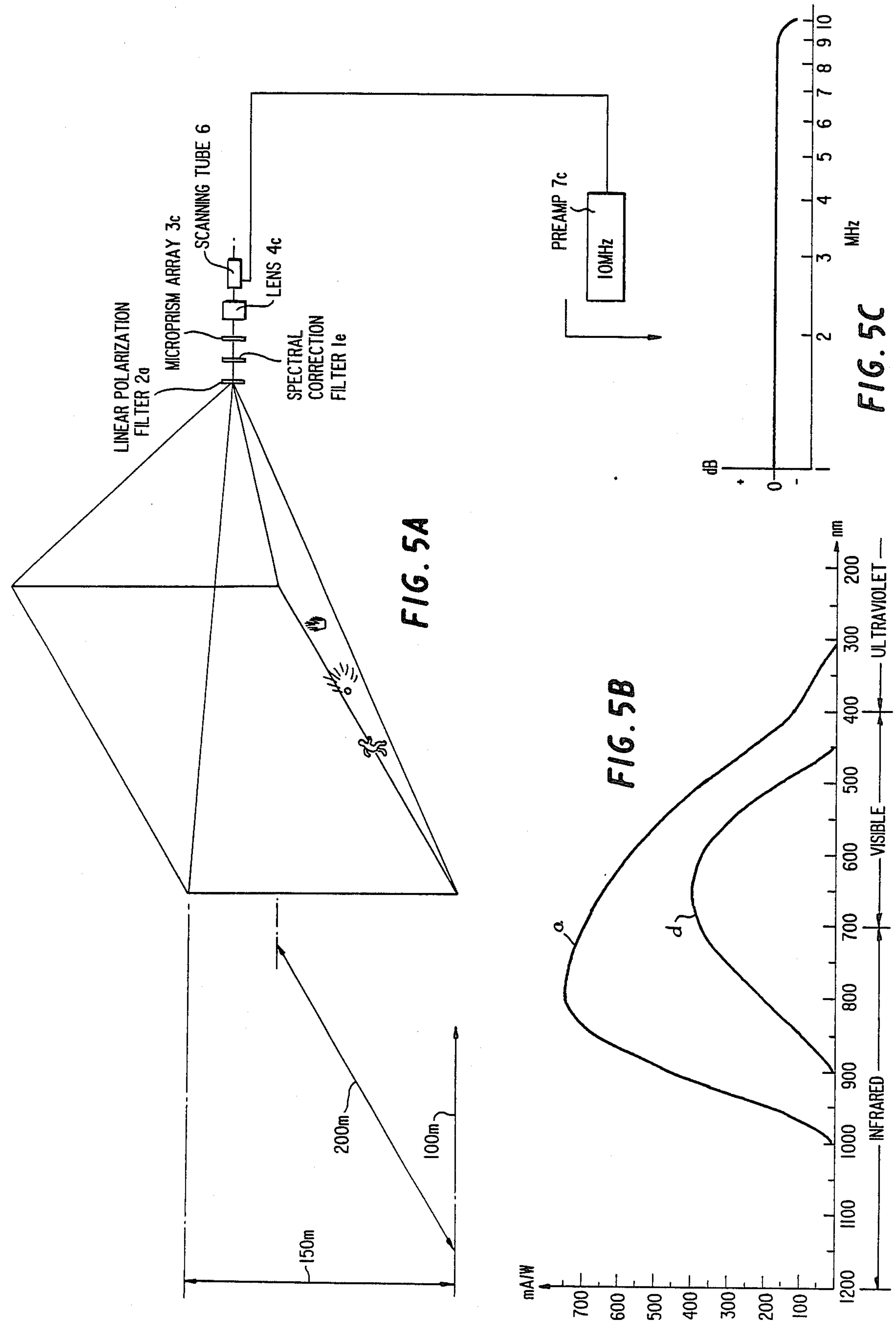

The general diagram is illustrated in FIG. 5A–5C and refers to the coverage of a possible risk of intrusion and/or fire and/or explosion situated at a maximum distance from the camera of about 100 m.

In this case, the following are used:

a linear polarizing filter 2*a*, a spectral correction filter 1*e* for obtaining the corrected spectral response curve d which is limited astride the infrared and visible spectra, namely between the values of the near infrared spectum and green of the visible spectrum (the response is limited to 50% between 510 and 800 mm, whereas the response is absolute between 450 and 900 mm), an array of microprisms 3*c* cut so as to have 500.000 microprisms, a lens 4*c* whose focal length is that of a super wide angle, more especially of 5.5 mm, to which value corresponds a horizontal coverage of 200 m and a vertical coverage of 150 m at the distance of 100 m, the video preamplifier 7*c* being adjusted so as to have a response curve up to 10 MHz.

EXAMPLE NO. 4

Figures 6A, 6B, 6C:
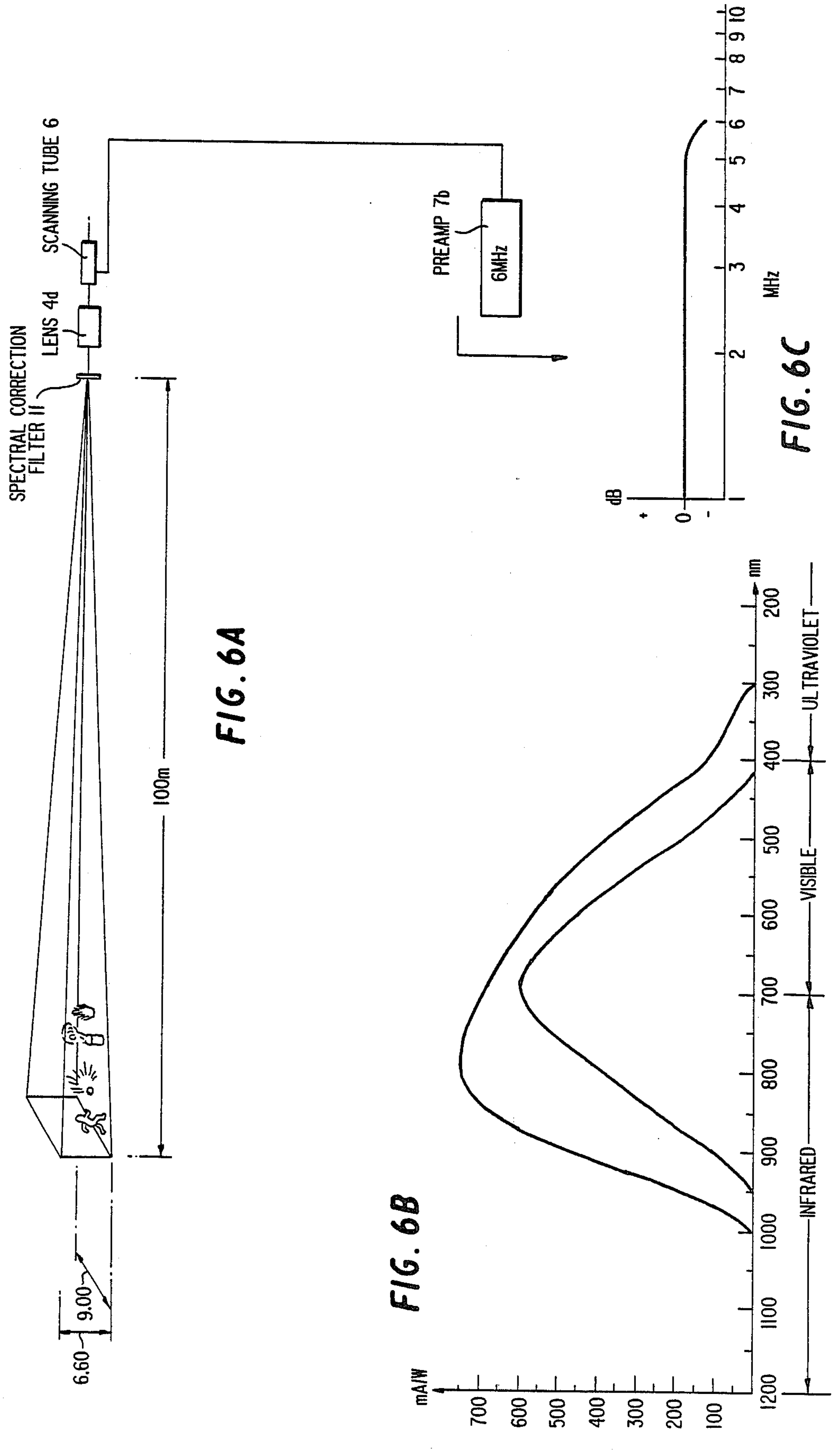

The general diagram is illustrated in FIG. 6A–6C and refers more particularly to the coverage of a possible risk of gas leak and/or fire and/or intrusion and/or explosion, situated at a maximum distance from the camera of about 100 m.

It is assumed that the gas is stored in the liquid state: then the leak is of course accompanied by a rapid change to the gaseous state. Now, this change of state, which occurs from the moment when the liquid gas comes into contact with the atmosphere, causes in this latter a sudden modification of the temperature and of its transparency properties.

In this case, the following are used:

a spectral correction filter 1*f* for obtaining the corrected spectral response curve which is limited astride the infrared and visible spectra, namely between the values of the near infrared spectrum and blue of the visible spectrum (the response is limited to 50% between 540 and 830 nm, whereas the response is absolute between 420 and 950 nm), a lens 4*d* whose focal length is 120 mm, for which a horizontal coverage of 9 m and a vertical coverage of 6.6 m is obtained at a distance of 100 m, the video preamplifier 7*b* being adjusted so as to have a response curve up to 6 MHz.

EXAMPLE NO. 5

Figure 7A:
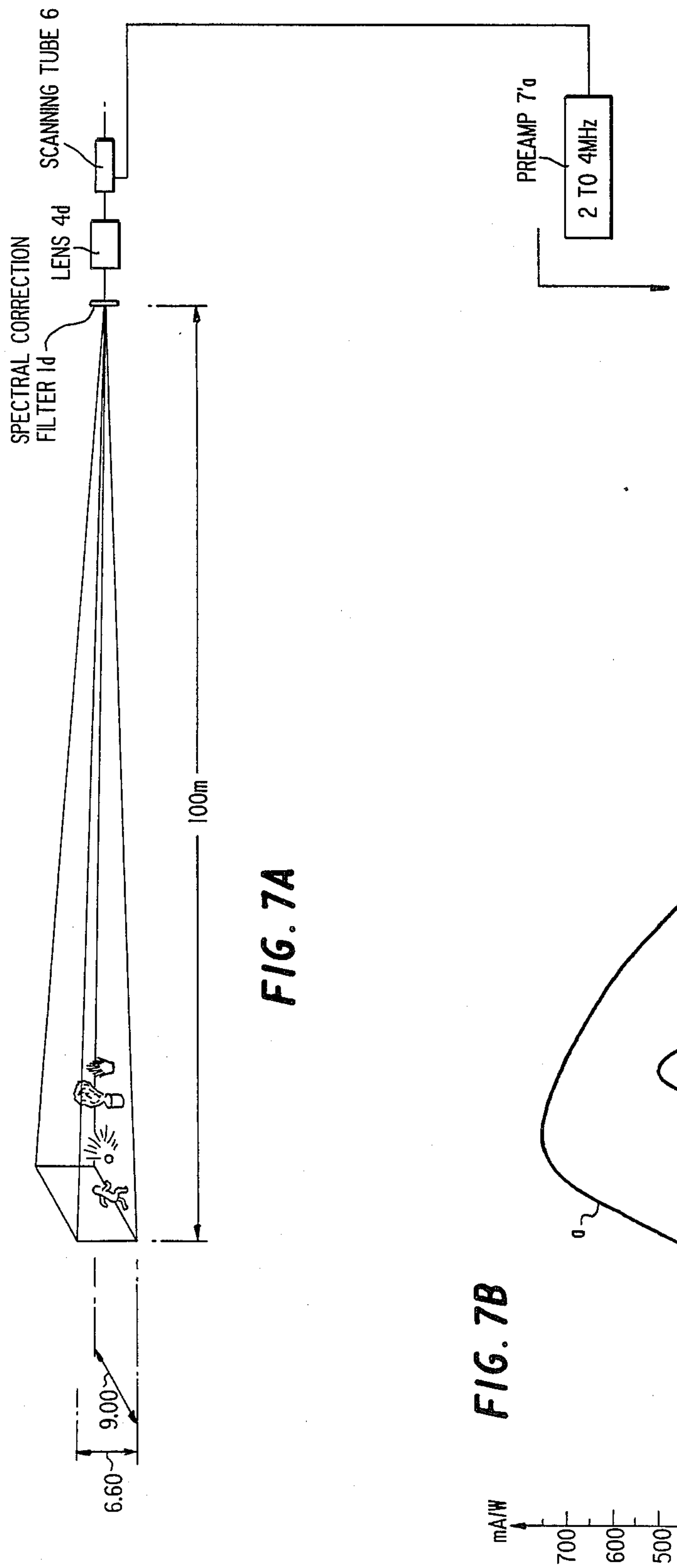
Figure 7B:
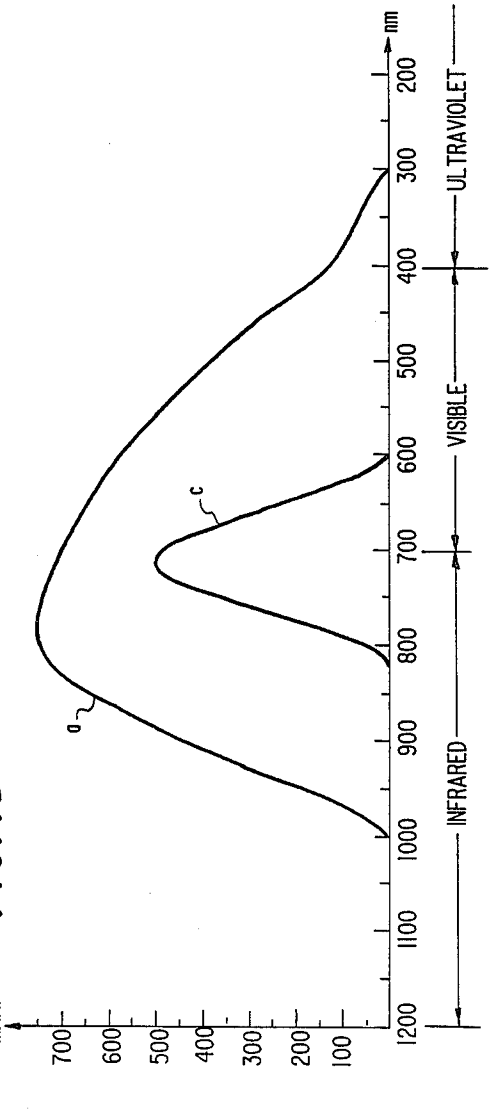
Figure 7C:
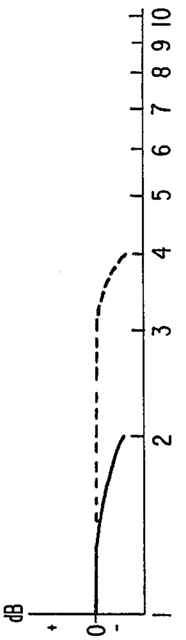

The general diagram is illustrated in FIG. 7A–7C and refers more particularly to the coverage of a probable risk of leak of certain vapors and/or fire and/or intrusion and/or explosion, situated at a maximum distance from the camera of about 100 m.

It should be emphasized that, starting with elements initially in the liquid state, detection is provided by illuminating the position at which the leak in question is likely to occur with sometimes visible and sometimes infrared lighting, depending on the chemical nature of the vapors monitored. Now, in the case of visible illumination, modification of the transparency of air is used, whereas with infrared illumination, this same transparency is used and the appearance of the luminescence phenomenon.

In this case, the following are used:

a filter 1*d* giving the same spectral correction defined by curve c in example 2, and a lens 4*d* having the same characteristics as those given in example 4, the video preamplifier 7'*a* being adjusted so as to have a response up to 2 or 4 MHz.

Within the scope of the present invention, "electric leak" may also be detected in a damaged insulator before the "flash", that is to say that the permanent leak current in a damaged insulator may be detected before its intensity results in a conventional electric arc; the corona effect may even be predicted (in combination with the simultaneous detection of intrusion and/or fire and/or explosion and/or fluid leak).

For this, advantage is taken of the fact that the radiations emitted in this type of situation are ultraviolet radiations and so a specific spectral response camera is used whose photosensitive surface has a spectral sensitivity covering a part of the visible spectrum (from blue) up to the $UV_1$ or $UV_2$ range of the ultraviolet spectrum.

As in the applications with infrared cameras, in this case also the spectral response curve of an "ultraviolet" camera must be modified (still as a function of the environmental characteristics and of the other possible risks contemplated), by using filters with known pass band restricted to be astride the visible spectrum and the ultraviolet spectrum, namely between blue of the visible spectrum and the $UV_1$ or $UV_2$ range of the ultraviolet spectrum.

Furthermore, with "ultraviolet" cameras polarization filters and microprism arrays may also need to be used; however, these devices—as well as the lenses—must be made from quartz, taking into account the very high degree of attenuation of optical glasses in the ultraviolet radiation range.

The following example illustrates a possible application using an "ultraviolet" camera.

EXAMPLE NO. 6

Figure 8A:
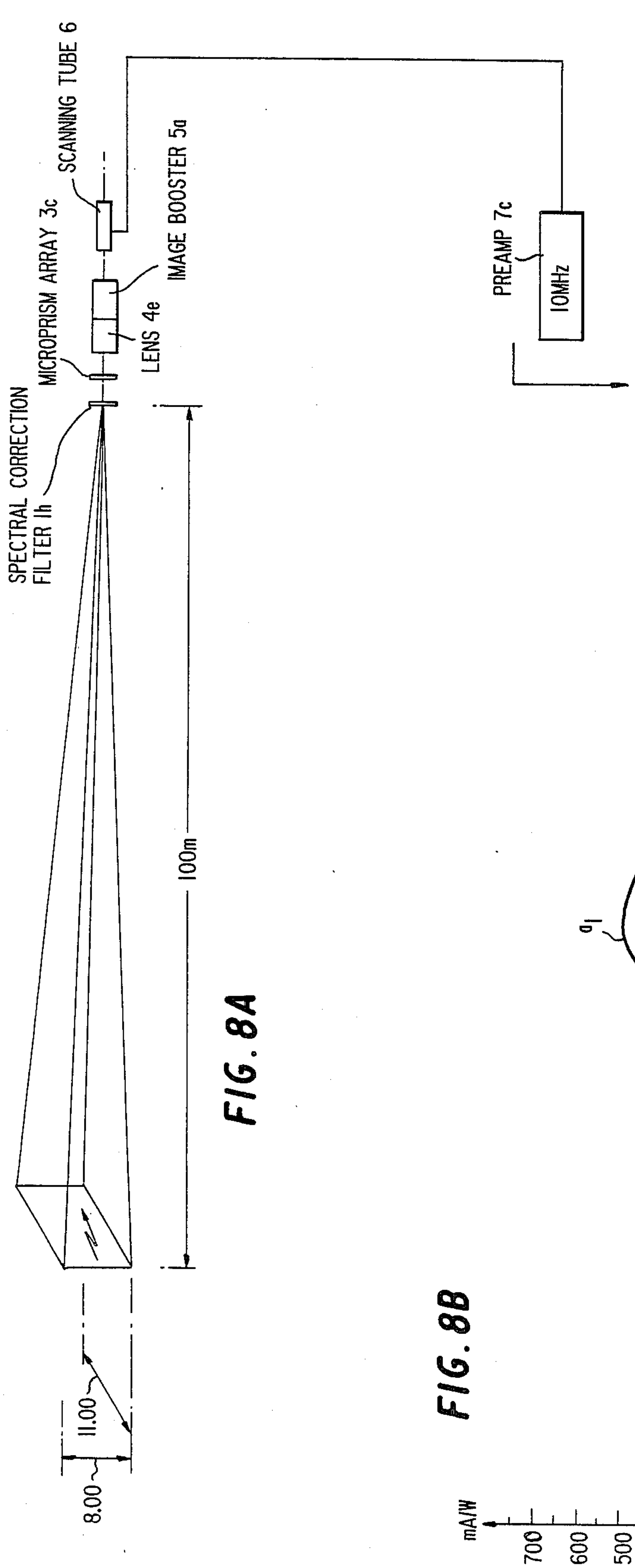
Figure 8B:
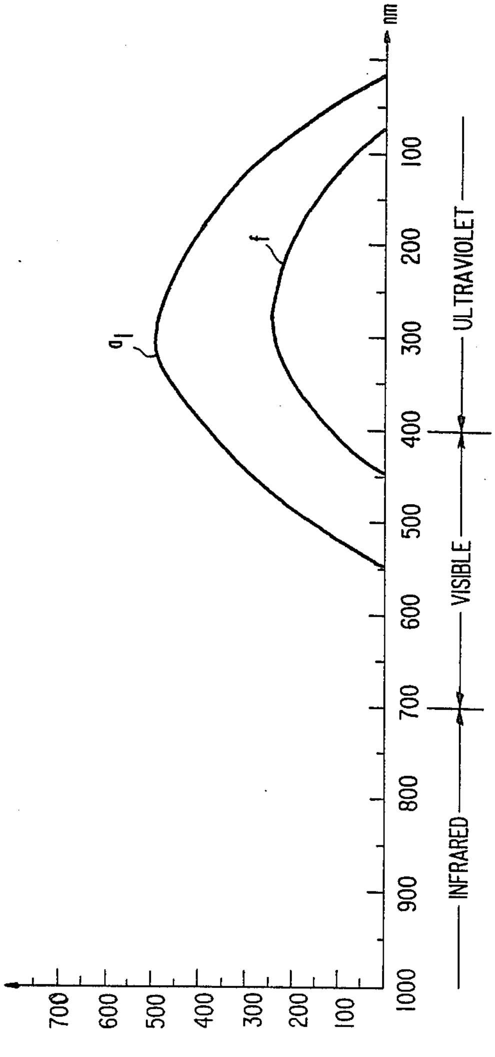
Figure 8C:
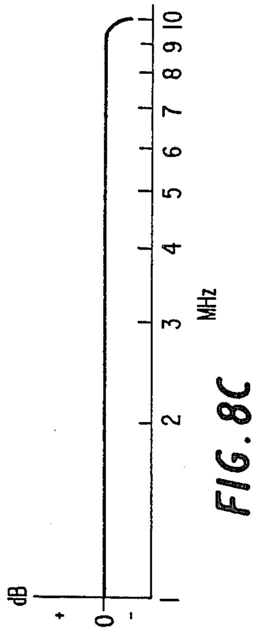

The general diagram is shown in FIG. 8A-8C and refers to the coverage of a probable risk of "electric" leak and/or intrusion and/or fire and/or explosion situated at a maximum distance from the camera of about 100 m.

In this case, the following are used:

a spectral correction filter 1*h* for correcting the spectral response curve $a_1$ of the camera so as to obtain the corrected curve f which is limited astride the upper part of the visible spectrum and the ultraviolet spectrum (the response is limited to 50% between 136 and 393 nm, whereas the response is absolute between 58 and 450 nm), a microprism array 3*c* cut so as to have 500.000 microprisms, a lens 4*e* whose focal lens is 100 mm, to which value corresponds a horizontal coverage of 11 m and a vertical coverage of 8 m, at the distance of 100 m, an image booster 5*a* of the second order, the video preamplifier 7*c* being adjusted so as to have a response curve up to 10 MHz.

It goes without saying that in all the above examples, when among the possible risks to be monitored there exists also a risk of explosion, the positioning of the camera must be calculated as a function of the potential power of the explosion and, in the case where this power cannot be estimated with sufficient accuracy, it is obvious that the minimum distance of the camera will correspond substantially to the maximum distance indicated in each of the above examples and, in general, to the maximum distance to be respected in the different real situations.

Furthermore, it is also possible to take particular protection measures consisting more particularly in using antiexplosion or armoured caissons or else concrete casemates, etc.

Generally, the system of the invention may be applied in any environment (including environments as hostile as those formed for example by sea depths and blast furnaces where very high pressures and temperatures reign, respectively) on condition that adequate means are provided for suitably isolating the data acquisition elements.

The very wide range of applications which may be envisaged within the scope of the present invention is such that its original character is demonstrated without any ambiguity, more especially in that, to the knowledge of the applicant, there exists up to the present time no system capable of predicting in particular the formation of an electric arc or of the corona effect, with the technical and economic advantages which that implies.

Although the examples refer, for the sake of simplicity, to the use of a single camera, the detection installations constructed using the system of the present invention may comprise a very large number of cameras.

In the general case, it is therefore a question of sharing the cameras between a number (substantially less) of video information processing units (for example one, two or more) which, in the most simple case, give the alarm and send back images to each of the video monitors associated with the cameras effectively used.

This basic configuration may be improved by adding a time delay unit, known per se, (and not shown), which receives the alarms given by the data processing units so as to trigger off an automatic telephone transmitter, it too known per se, in the case of absence or immobilization (aggression) of the guardian or guardians, after a certain (programmed) time has elapsed. When the guardians are present and able to use the detected signals, they have the programmed lapse of time for cancelling out the telephone transmission using a digital keyboard with which said timing unit is equipped.

To the basic configuration of the detection installation thus modified may also be added a cyclic switch and a video tape recorder with time clock (not shown because these devices are all known per se) and this for each group of cameras (and so of monitors) connected to a data processing unit: in a normal situation, the different cameras of each group are scanned cyclically and the images are recorded, by the corresponding video tape recorder, as a succession of fixed images. In an alarm situation, the data processing unit couples the camera which detected the calamity to the video tape recorder and begins to record in real time.

In the case where the monitoring post is relatively distant from the position of the cameras, a television telephone transmitter, known per se, (and not shown), transmits the processed video information and the video information to said monitoring station, said telephone transmitter being able to call an alarm reception station (known per se) using the normal telephone network.

It goes without saying that in the basic starting configuration may also be included a loud speaker network which, in an abnormal situation, may broadcast a sound message (manually or automatically) in the protected zone or zones.

(The devices situated downstream with respect to the video data processing units are generally designated in FIG. 1 by UE, which designation refers to the "Units of Exploitation".

Furthermore, it is clear that the position of the different cameras depends, for one or more outside and/or inside zones to be protected, on the field of vision and on the environmental constraints (more particularly in so far as the outside is concerned), namely on the existence of optical disturbances consisting for example of the presence of mercury vapor lighting and/or fog and/or moving objects, etc.

It must be once more emphasized that the applications indicated in the present description have no limitative character, since other applications may be envisaged without for all that departing from the scope and spirit of the invention, in that the detection system of the invention may be used not only for detecting phenomena, possibly simultaneous, such as intrusion and/or fire, and/or explosion and/or leaks (of fluids and "electric" ones), but also in all cases where the disturbance or absence of a movement must be detected which, in a normal situation, is regular or periodic (in this connection, it is easy to envisage applications in the medical field as well, for example).

As follows from the foregoing the invention is in no way limited to those of its embodiments and modes of application which have been described more explicitly; it embraces, on the contrary, all variants thereof which may cccur to a technician skilled in the matter, without departing from the scope and spirit of the present invention.

What is claimed is:

1. A device for the instantaneous and simultaneous detection, inside and outside of radiations emitted in the infrared, visible and ultraviolet spectra by simultaneous physical phenomena having a character of risk, such as intrusion, fire, explosion, leaks of dangerous fluids and electric leaks, disturbance and absence of movement of a regular periodic phenomenon, said radiations being emitted directly by said physical phenomena at the time when said risk appears or being caused artificially by directing over an appropriate field of view, in which said phenomena take place, a source of radiation comprised in the infrared, visible and ultraviolet spectra and adapted for response to the phenomena involved, the field of view covered by the detection device having horizontal and vertical dimensions, wherein said detection device is formed by a television camera disposed at a distance from said field and having:

a lens, a video preamplifier comprising:

a plurality of preamplification stages, each having an input and an output circuit with loads inserted in each output circuit, and a negative feedback network connected between an output and an input of said video preamplifier, said loads and said negative feedback network being chosen in order that said video preamplifier generates a response curve which extends over a band of frequencies appropriate to the spectrum of said radiations, a scanning tube connected to said video preamplifier, and at least one spectral correction filter, chosen as a function of the nature of said radiations, which is disposed in front of said lens.

2. Device according to claim 1, further comprising a polarization filter disposed in front of said at least one spectral correction filter.

3. Device according to claim 2, wherein said polarization filter is a linear one.

4. Device according to claim 2, wherein said polarization filter is a circular one.

5. Device according to claim 1, further comprising an array of microprisms, said microprisms being cut so as to have a number of microprisms adapted for diffraction of said physical phenomena taking place in said field and disposed between said lens and said at least one spectral correction filter.

6. Device according to claim 1, further comprising an image booster coupled to the lens of the camera having a focal length which is chosen as a function of the distance existing between said camera and said field as well as a function of the horizontal and vertical dimensions of the field covered by the detection device.

7. Device according to claim 1, further comprising a polarization filter disposed in front of said at least one spectral correction filter and an array of microprisms, said microprisms being cut so as to have a number of microprisms adapted for diffraction of said physical phenomena taking place in said field and disposed between said lens and said at least one spectral correction filter.

8. Device according to claim 1, further comprising a polarization filter disposed in front of said at least one spectral correction filter, an array of microprisms, said microprisms being cut so as to have a number of microprisms adapted for diffraction of said physical phenomena taking place in said field and disposed between said lens and said at least one spectral correction filter, and an image booster coupled to the lens of the camera having a focal length which is chosen as a function of the distance existing between said camera and said field as well as a function of the horizontal and vertical dimensions of the field covered by the detection device.

9. Device according to claim 1, further comprising an array of microprisms, cut so as to have a number of microprisms adapted for diffraction of said physical phenomena taking place in said field and disposed between said lens and said at least one spectral correction filter and an image booster coupled to the lens of the camera having a focal length which is chosen as a function of the distance existing between said camera and said field as well as the function of the horizontal and vertical dimensions of the field covered by the detection device.

10. A device for the instantaneous and simultaneous detection, inside and outside, of radiations emitted in the infrared, visible and ultraviolet spectra by simultaneous physical phenomena having a character of risk, such as intrusion, fire, explosion, leaks of dangerous fluids and electric leaks, disturbance and absence of movement of a regular periodic phenomenon, said radiations being emitted directly by said physical phenomena at the time when said risk appears or being caused artificially by directing over an appropriate field of view, in which said phenomena take place, a source of radiation comprised in the infrared, visible and ultraviolet spectra and adapted for response to the phenomena involved, the field of view covered by the detection device having appropriate horizontal and vertical dimensions, wherein said detection device is formed by a television camera disposed at an appropriate distance from said field, and having:

a lens, a video preamplifier comprising:

a plurality of preamplification stages, each having an input and an output circuit with loads inserted in each output circuit, and a negative feedback network connected between an output and an input of said video preamplifier, said loads and said negative feedback network being chosen in order that said video preamplifier generates a response curve which extends over a band of frequencies appropriate to the spectrum of said radiations, a scanning tube connected to said video preamplifier, at least one spectral correction filter, chosen as a function of the nature of said radiations, which is disposed in front of said lens, a polarization filter disposed in front of said at least one spectral correction filter, an array of microprisms, cut so as to have a number of microprisms adapted for diffraction of said physical phenomena taking place in said field and disposed between said lens and said at least one spectral correction filter, an image booster coupled to the lens of the camera having a focal length which is chosen as a function of the distance existing between said camera and said field as well as a function of the horizontal and vertical dimensions of the field covered by the detection device.

11. An installation for the instantaneous and simultaneous detection, inside and outside, of radiations emitted in the infrared, visible and ultraviolet spectra by simultaneous physical phenomena having a character of risk, such as intrusion, fire explosion, leaks of dangerous fluids and electric leaks, disturbance and absence of a movement of a regular periodic phenomenon, said radiations being emitted directly by said physical phenomena at the time when said risk appears or being caused artificially by directing over an appropriate field of view, in which said phenomena take place, a source of radiation comprised in the infrared, visible and ultraviolet spectra and adapted for response to the phenomena involved, said field of view covered by the detection device having appropriate horizontal and vertical dimensions, said installation comprising in combination:

at least one detection device formed by a television camera disposed at an appropriate distance from said field and having:

a lens, a video preamplifier comprising:

a plurality of preamplification stages, each having an input and an output circuit with loads inserted in each output circuit, and a negative feedback network connected between an output and an input of said video preamplifier, said loads and said negative feedback network being chosen in order that said video preamplifier generates a response curve which extends over a band of frequencies appropriate to the spectrum of said radiations, a scanning tube connected to said video preamplifier, at least one spectral correction filter, chosen as a function of the nature of said radiations, which is disposed in front of said lens, a polarization filter disposed in front of said at least one spectral correction filter, an array of microprisms, cut so as to have a number of microprisms adapted for diffraction of said physical phenomena taking place in said field and disposed between said lens and said at least one spectral correction filter, an image booster coupled to the lens of the camera having a focal length which is chosen as a function of the distance existing between said camera and said field as well as a function of the horizontal and vertical dimensions of the field covered by the detection device, at least one video data processing unit producing an alarm signal in response to the detection of said phenomena having a character of risk and comprising an analog digital converter associated with a microcomputer equipped with a video-graphic interface, at least one video monitor, each associated with a detection device by means of said video data processing unit.

* * * * *